Patented June 15, 1943

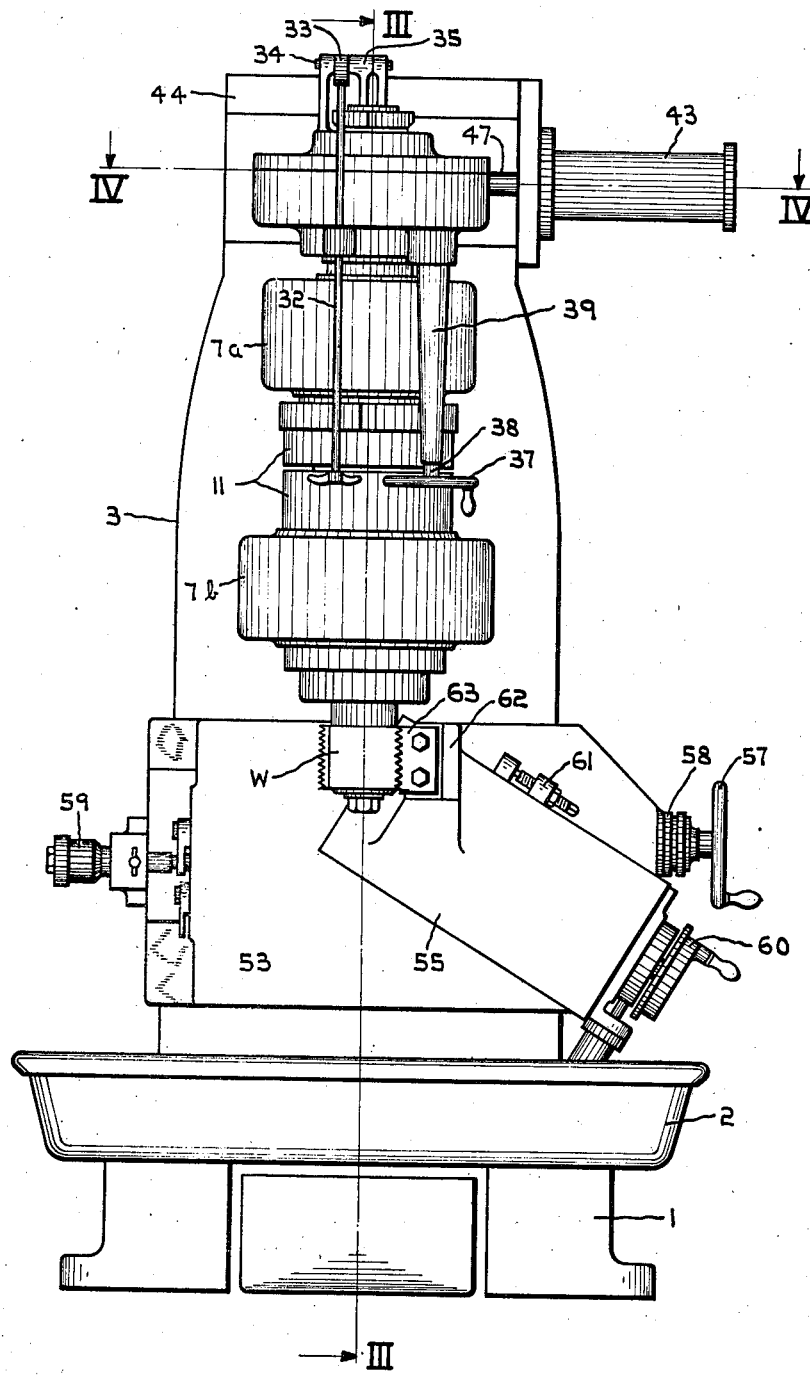
FIG. I

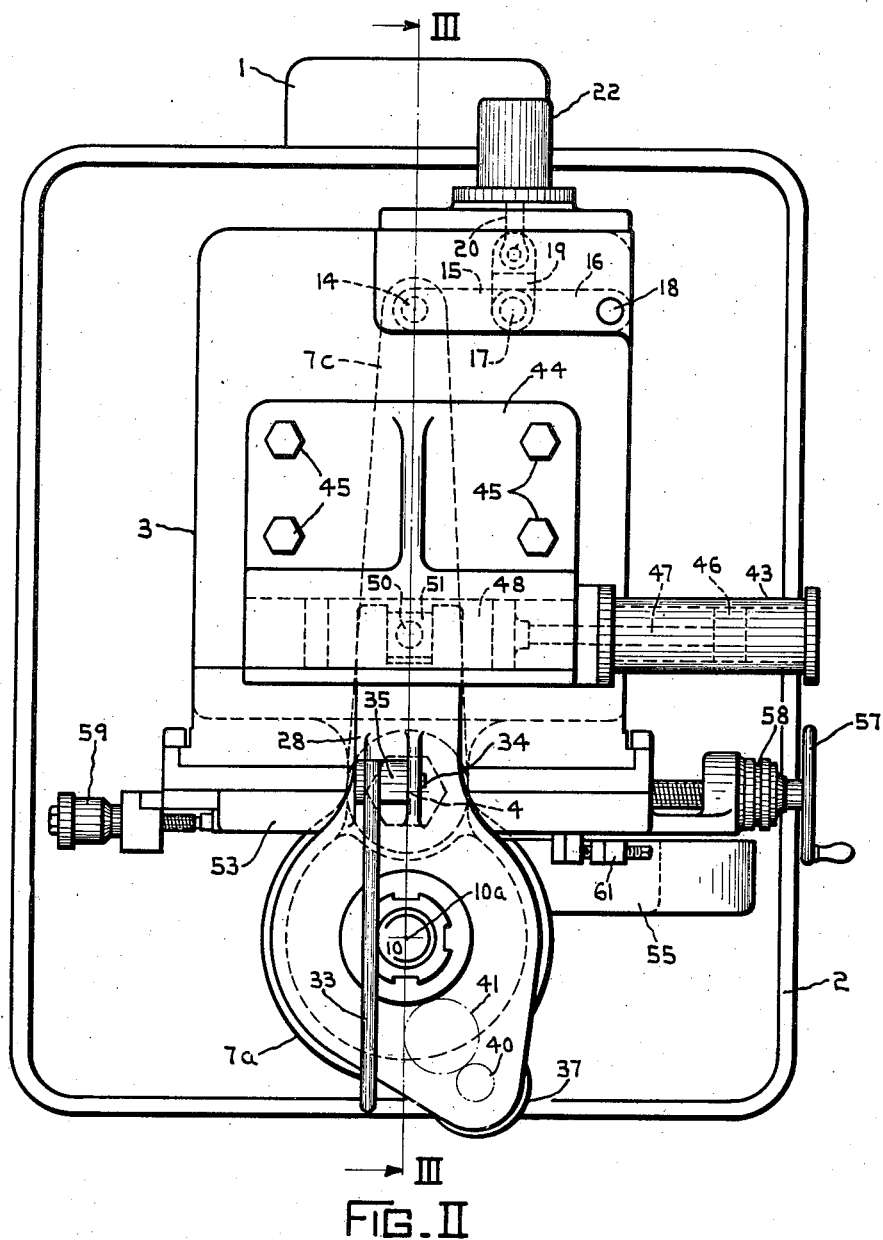
FIG. II

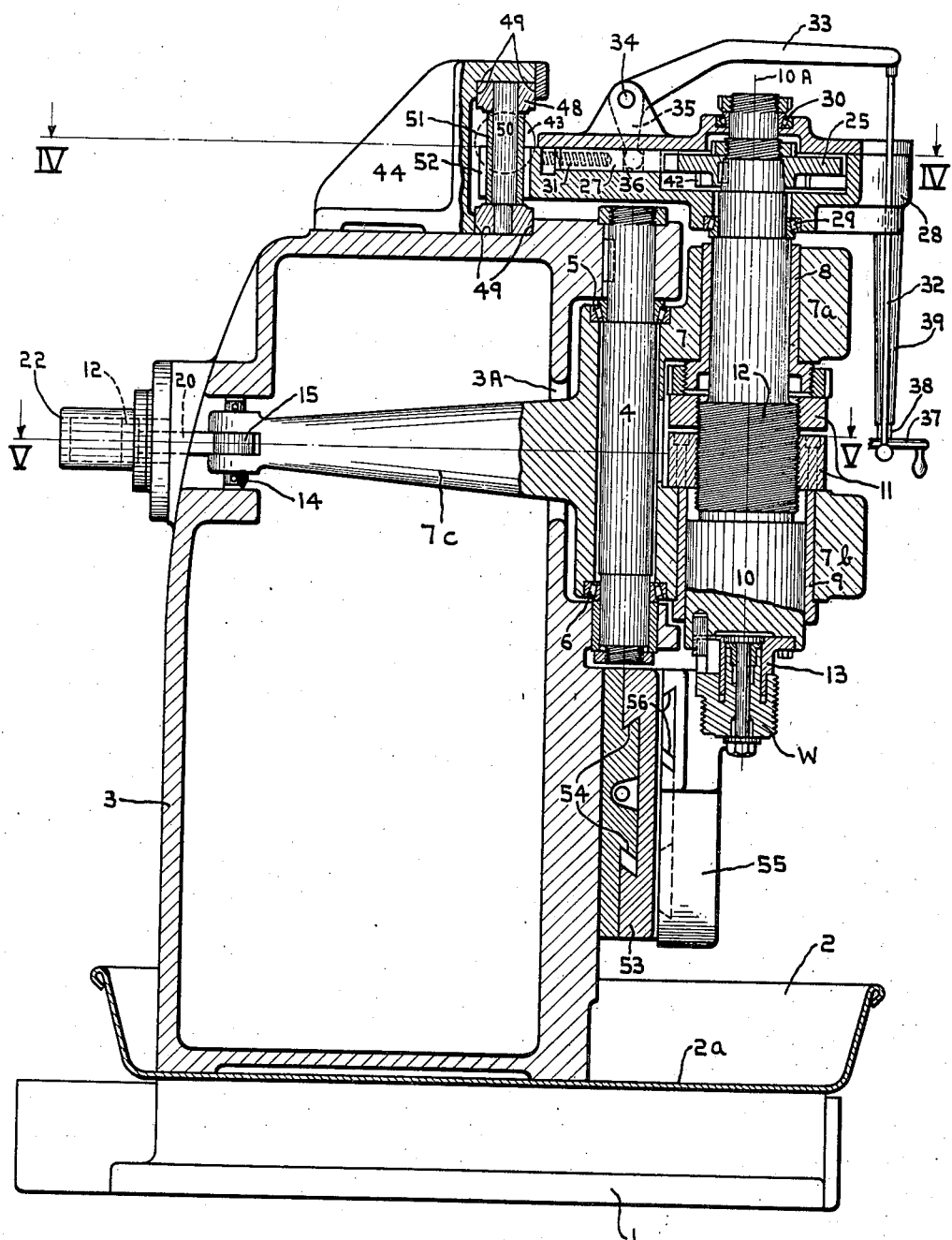
FIG. III

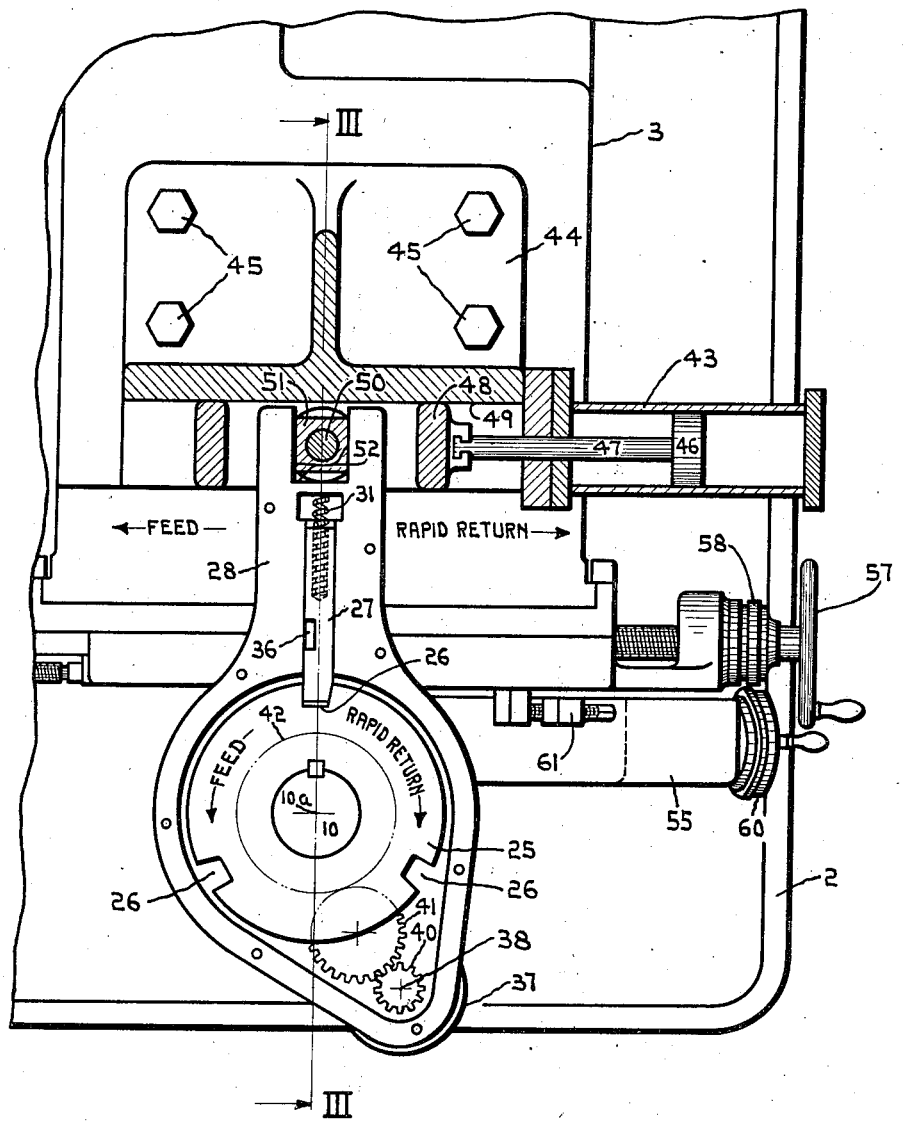
FIG. IV

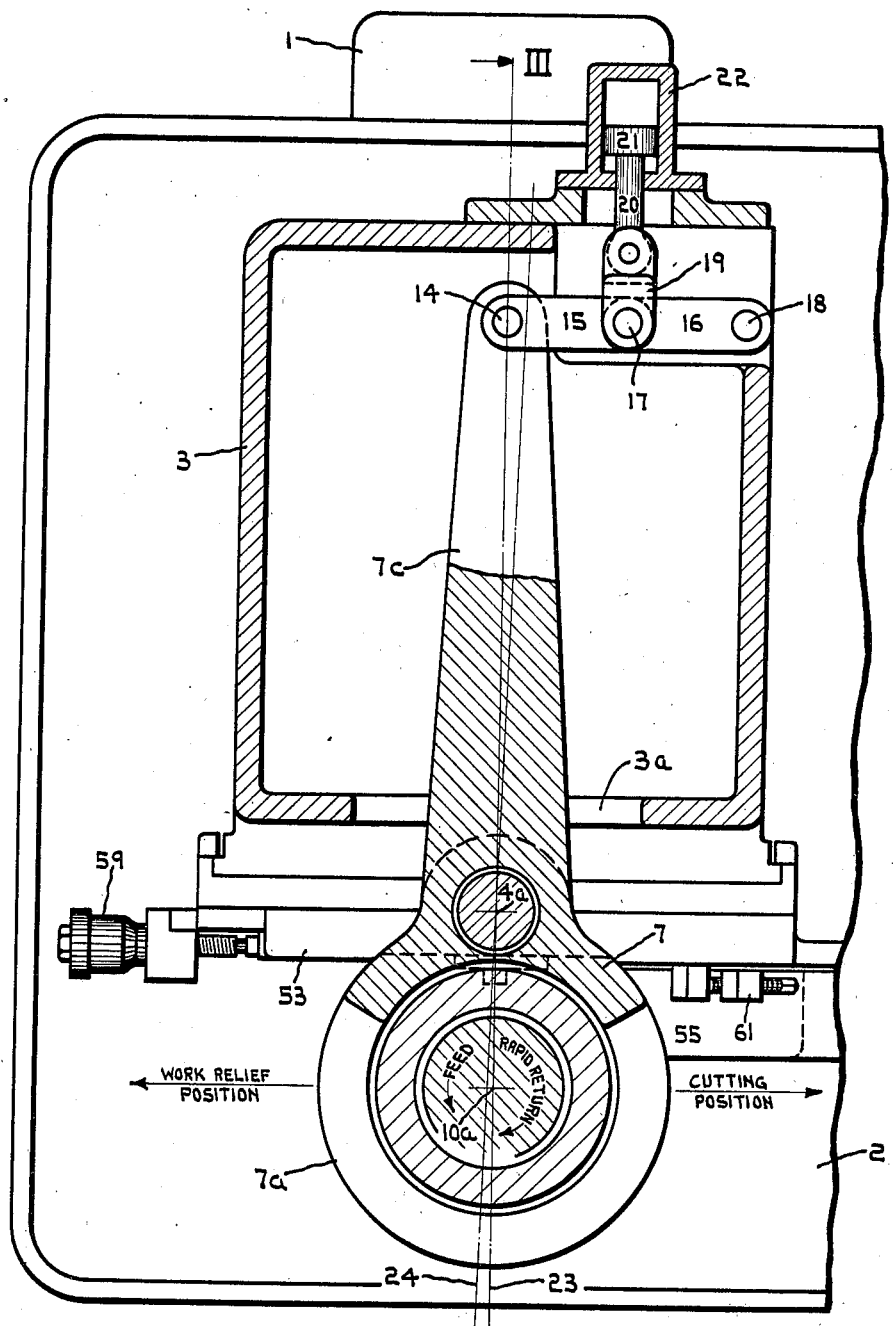

2,322,127

UNITED STATES PATENT OFFICE 2,322,127

VERTICAL CIRCULAR SHAPING MACHINE

William F. Groene, Cincinnati, Ohio, assignor to The R. K. Le Blond Machine Tool Company, Cincinnati, Ohio, a corporation of Delaware Application April 5, 1943, Serial No. 481,851

7 Claims. (Cl. 10—101)

This invention pertains to a vertical circular shaping machine and is especially related to improvements in the design and arrangement of machine elements of such machine of a type illustrated in applicant's prior application, Serial #423,600, filed December 19, 1941 (issued as Patent No. 2,318,305, May 4, 1943). Essentially the main idea of the present invention is to organize a circular shaping machine mechanism in a vertical arrangement to provide more efficient operation, better disposal of the chips, greater ease in mounting the work in the machine, and in providing better access to the entire machine mechanism for the operator.

Primarily it is an object to arrange the rocking work spindle of the circular shaping machine in a vertical position above the working area of the machine and to mount the work piece being operated upon at the lower end of the work spindle and to apply the cutting tool feeding mechanism to one side of the work spindle axis and to feed it toward the work mounted on the lower end of the work spindle.

Another object is to arrange the manipulating controls for the tool feeding devices to the right of the operator when facing the machine for convenience in operating these mechanisms for exact setting, control, and movement of the cutting tools relative to the work piece mounted on the work spindle.

Still another object of this invention is to mount all operating mechanisms, for oscillating the work spindle and for indexing it to the various positions for step thread cutting, well above the working area and work and tool contacting point of the machine so as to remove all of this mechanism from any possible coolant, cutting chips, or foreign matter which may otherwise come in contact with this mechanism during the cutting operation.

A still further object of this invention is to have the actuating mechanism, for rocking the work spindle at feed and rapid return motion, operable in a direction substantially parallel to the direction of work relief movement and substantially parallel to the direction of tool feeding and setting movement of the machine in order to provide a more smoothly operating apparatus when both the work rocking and tool relief operations are functioning together with the feeding movement of the cutting tools to the work piece on the work spindle.

Further features and advantages of this invention will appear from the detailed description of the drawings in which:

Figure I is a front elevational view of a vertical circular shaping machine exemplifying this invention.

Figure II is a plan view of the vertical circular shaping machine shown in Figure I.

Figure III is a vertical transverse section through the vertical circular shaping machine, on the line III—III of Figures I, II, IV, and V, particularly showing the work spindle mounting and the oscillating mechanism and work relieving mechanism of the shaping machine, together with the indexing mechanism for setting the work spindle in various indexed positions for step thread cutting.

Figure IV is a fragmentary enlarged horizontal section through the machine on the line IV—IV of Figures I and III, particularly showing the indexing mechanism for the work spindle for orienting it at different positions for step thread cutting.

Figure V is a fragmentary enlarged horizontal section on the line V—V of Figure III, particularly showing the work relieving mechanism for removing the work spindle away from the cutting tools during the return stroke of the work spindle back to initial starting position for another arcuate shaping cut.

Referring particularly to Figure III, the machine comprises a base 1 on top of which is mounted the coolant and chip collecting pan 2 and in which sets the upright column 3 securely fixed to the base portion 1 of the machine. In the upper portion of this column 3 is rigidly mounted in a vertical position a trunnion shaft 4 which carries bearings 5 and 6 in which is rockably mounted the work spindle headstock 7 having portions 7a and 7b respectively containing bearings 8 and 9 in which is journaled for both rotary and axial movement the work spindle 10. In between the members 7a and 7b is provided a suitable nut arrangement 11 which operates on the threaded portion 12 of the work spindle 10 so that as the work spindle is rocked in feeding and rapid return movements it will likewise progress axially in the bearings 8 and 9 in instances where a lead or step thread is to be cut on a work piece W mounted on the lower end of the work spindle 10 by any suitable chucking mechanism 13.

Formed integral with the headstock 7 is the actuating arm 7c, referring particularly to Figure V, which extends through a suitable opening 3a in the housing 3 and has at its rear end a pivot pin 14 connected through a pair of links 15 and 16 to a pin 17, the link 16 being connected by a pin 18 fixed in the housing 3, so as to form a toggle link arrangement connected by means of a third link 19 to the piston rod 20 of a piston 21 in the work relief cylinder 22 fixed on the rear portion of the column 3. Reciprocation of the piston 21 in cylinder 22 rocks the headstock 7 about the trunnion axis 4 from a working position indicated by the line 23 to a work relief position indicated by the line 24, Figure V, the purpose of which motion is to remove the work from contact with the cutting edge of the tool as the work is rocked back again at rapid return motion for the beginning of another rocking feed motion to thus prevent wear on the cutting edge of the tool and damage and scuffing of the work piece.

The mechanism for rocking the work spindle 10 in the bearings 8 and 9 in the headstock 7 for effecting the arcuate feeding and rapid return motion in the work W mounted on the work spindle, is best shown in Figures III and IV. On the upper end of the spindle 10 is fixed the indexing disc 25 having a plurality of indexing notches 26 corresponding, in this particular illustration, to the number of different sets of step threads on a work piece W to be cut. An indexing plunger 27 slidably mounted in the rocking housing 28, journaled in suitable bearings 29 and 30 about the work spindle axis 10a, is normally urged into contact with the disc 25 and the various notches 26 by means of a suitable compression spring 31. A control lever 32 connected at its upper end to an operating arm 33 pivotally mounted on a suitable pin 34 on the rocking member 28 and having a depending bell crank arm 35 engaging in the slot 36 of the index pin 27 may be utilized, when the operating rod 32 is pulled down, to withdraw the index pin 27 from one of the index notches 26 to permit the free rotation of the disc and work spindle in its bearings 8 and 9 to a desired reoriented position. Release of the control rod 32 of course under the influence of the spring 31 will again permit the index plunger 27 to reinsert itself in one of the indexing notches brought into alignment with it. Thus the work spindle may be set at a plurality of different indexed positions and in connection with the nut 11 and thread 12 to also move the spindle to the desired axially displaced position for properly cutting step threads on the work piece W.

In order to facilitate the rotation of the work spindle to the desired position a control mechanism is provided comprising the hand wheel 37 carried on an operating shaft 38 in a depending bracket 39 which has on its upper end a pinion 40 operating in an idler gear 41 appropriately journaled in the rocking house 28. This idler gear engages a gear 42 fixed on the hub of the index disc 25 fixed on the work spindle 10. Thus, when the draw rod 32 is pulled down, the hand wheel 37 may be rotated to bring the spindle and index disc 25 to any desired index position. Thus with the index pin 27 locked in one of the notches 26 of the index disc 25, rocking motion effected in the member 28 will cause similar rocking motion of the work spindle 10 in the bearings 8 and 9 in the headstock 7. This rocking of the member 28 is accomplished by effecting a motion of feed and rapid return in a direction substantially parallel to the direction of tool relief by the apparatus shown in Figure V. This reciprocating apparatus for the member 28 comprises a fluid pressure cylinder 43 rigidly fixed to a bracket 44 mounted on suitable screws 45 on the top of the housing 3 and contains a piston 46 connected by means of a piston rod 47 to a cross head 48 sliding in appropriate guide ways 49 formed in the bracket 44. This cross head 49 has fixed in it a pin 50 carrying a square block 51 journaled upon it which operates in a slot 52 formed in the rear portion of the member 28 so that the reciprocation of the cross head 48 by the piston 46 will cause rocking motion in the member 28 around the axis 10a of the work spindle.

Motion of the piston 46 and cross head 48 takes place substantially parallel to the direction of work relief motion shown in Figure V. By this particular arrangement the difficulties with the connection formed by the square block 51 in the slot 52 of the manner 28 are substantially completely eliminated as the relative swinging motion for work relief has relatively little effect on displacing the relationship of the block 51 in the slot 52 of the member 28 and thereby cuts down wear, frictional losses, and other unnecessary motion which prevents the smooth operation of the machine of former design. Thus when the piston 46 moves to the left in Figure IV, the member 28 will be rocked and together with the index plunger 27 in a notch 26 rotates the work spindle 10 in a counterclockwise or feeding direction to effect an arcuate shaping cut on the work. Immediately upon the completion of this cut the tool relief cylinder 22 operates to move the entire headstock from position 23 to position 24 whereupon the cylinder 43 has its piston 46 moved back again to the right in Figure IV for rapid return rocking motion of the work spindle bringing the work spindles back to an initial cutting position again ready for the beginning of another cutting feed motion. As soon as the work spindle has been returned to this initial starting position the cylinder 22 again operates to return the entire headstock assembly from position 24 back to the position 23 whereupon the piston 46 and cylinder 43 again make a forward feeding stroke. This cycle continues until the work has been completed.

In order to continue a cutting action of the cutting tools on the work the tool feeding mechanism is provided which comprises a main slide 53 carried on suitable dovetail guideways 54 for horizontal movement on the front of the column 3 directly below the entire work spindle and headstock assembly mechanism above described. On this slide is provided in instances where step threading is to be accomplished, a supplementary slide 55 on suitable dovetail guideways 56 on the main slide 53. Suitable adjusting means 57 comprising the handwheel 57 having graduated indicating mechanism 58 and positive accurate stop setting mechanism 59 is provided for the accurate manipulation and setting of the main slide 53. A supplemental slide used when cutting step threads, is likewise provided with accurate setting and ratchet feeding mechanism 60 and positive stop mechanism 61 which need not be described in detail since the specific structure of this mechanism forms no particular part of this invention. On the supplemental slide 55 an appropriate tool holder 62 is mounted having a suitable cutting tool 63, in this instance a multiple step thread cutting tool, for operating upon a work piece W having step threads such as a breech block for a gun. Thus with this arrangement the entire cutting tool feeding mechanism comprising the main slide 53, the supplemental slide 55, and the tool holder 62 are all located below the spindle headstock mechanism and other operative structures for controlling the movement of the work spindle. It will further be noted that these tool slides are mounted to the rear on the main column not directly below the cutting tool and work so that all material cut from the work piece during the machining operations will drop directly down into the front portion 2a of the chip coolant pan 2 of the machine and will at no time deposit themselves upon any operative structure of the lathe to thereby destroy their accuracy and cause foreign matter and dirt to become entangled in the operating mechanism. This brings about a high degree of maintained accurate life for the machine as a whole and also greatly facilitates manipulation of the machine on the part of the operator as the main operating mechanism for controlling tool feeding devices, requiring constant attention by the operator, are easily accessible and free from any interference by other portions of the machine structure. Normally, during the feeding of these cutting tool devices while the spindle is operating in rocking feed and rapid return and in tool relief motions as described with respect to Figures IV and V, the apparatus 60 constantly feeds the cutting tool 63 into the work until the desired depth is reached and the stop 61 comes into play. The main slide 53 may be set to any desired fixed position for straight cutting perpendicular to the axis 10a of rotation of the work spindle or may be set to a given angular position for the particular type of work piece which is to be operated upon by the feeding motion effected in the slide 55.

Having thus fully set forth and described my invention what I claim as new and desire to secure by United States Letters Patent is:

1. In a circular shaping machine; a frame; a horizontally rockable headstock mounted upon said frame; a work spindle rotatable and axially movable in said headstock about a vertical axis; work holding mechanism on the lower end of said work spindle; tool feeding mechanism mounted on said frame below said headstock for movement relative to the work piece on said work spindle; and means for rocking said headstock, rotating said work spindle, and feeding said tool feeding devices relative to a work piece mounted on the lower end of said work spindle.

2. In a circular shaping machine; a base; a vertically disposed column mounted on said base; a rockable headstock pivotally mounted on a vertical axis on the upper end of said column; means on said column for rocking said headstock; a rotatable and axially movable work spindle journaled in said headstock; work holding mechanism on the lower end of said work spindle; tool feeding devices mounted on said column below said work spindle; cutting tools on said tool feeding devices; and means for actuating said tool feeding devices relative to a work piece mounted on the lower end of said work spindle.

3. In a circular shaping machine; a base; a vertically disposed column mounted on said base; a rockable headstock pivotally mounted on a vertical axis on the upper end of said column; means on said column for rocking said headstock; a rotatable and axially movable work spindle journaled in said headstock; work holding mechanism on the lower end of said work spindle; tool feeding devices mounted on said column below said work spindle; cutting tools on said tool feeding devices; and means for actuating said tool feeding devices relative to a work piece mounted on the lower end of said work spindle; means on said headstock for rotating said work spindle to a plurality of indexed positions; and means on said column for rocking said work spindle in said headstock.

4. In a vertical circular shaping machine; a frame; a headstock movably mounted on said frame; means on said frame for actuating said headstock in said movement; a work spindle journaled in said headstock; means journaled on said work spindle for rocking said work spindle in said headstock; means in connection with said last mentioned means for rotating said work spindle to a plurality of indexed positions relative to said rocking means for said work spindle; and means on said frame for bodily actuating said rocking means for rocking said work spindle; and tool feeding devices on said frame associated with the lower end of said work spindle for engaging a work piece mounted thereon.

5. In a circular shaping machine; a frame; a headstock horizontally movably mounted on the upper portion of said frame; tool feeding devices associated with said headstock mounted on the lower portion of same frame for horizontal feeding movement relative to a work spindle mounted in said headstock; means on said movable headstock for rocking said work spindle; means for indexing said work spindle to a plurality of different positions in said headstock; means on said frame for moving said headstock, for moving said rocking mechanism for said work spindle, and for feeding said tools relative to a work piece on said work spindle.

6. In a vertical circular shaping machine; a base; an upright column mounted on said base; a headstock pivotally mounted for swinging about a vertical axis on said upper portion of said column; a work spindle journaled in said headstock for rocking and axial movement therein; means on said column for rocking said headstock; a rocking frame journaled on said work spindle; means for locking said frame to said work spindle; and means on said column for actuating said rocking member to effect rocking motion in said work spindle; tool feeding devices located on the lower portion of said column below said headstock and work spindle; and cutting tools on said tool feeding devices adapted to engage work mounted on the lower end of said work spindle.

7. In a vertical shaping machine; a base; a vertically arranged column mounted on said base; a headstock pivotally mounted on the upper portion of said column; means on said column for rocking said headstock; a work spindle journaled in said headstock for rotary and axial movement therein; a rocking member journaled on said work spindle; means on said frame for actuating said rocking member; indexing mechanism positively connecting said rocking member to said work spindle; means for engaging or disengaging said indexing mechanism; means for rotating said work spindle when said positive indexing driving means is disconnected from said work spindle; tool feeding mechanism associated with said work spindle located on the frame below said headstock; a horizontally movable slide in said tool feeding device; an angularly movable slide on said first mentioned tool feeding slide; and means for effecting feeding motion in said slide relative to a work piece mounted on the lower end of said work spindle.

WILLIAM F. GROENE.